Figure 1:
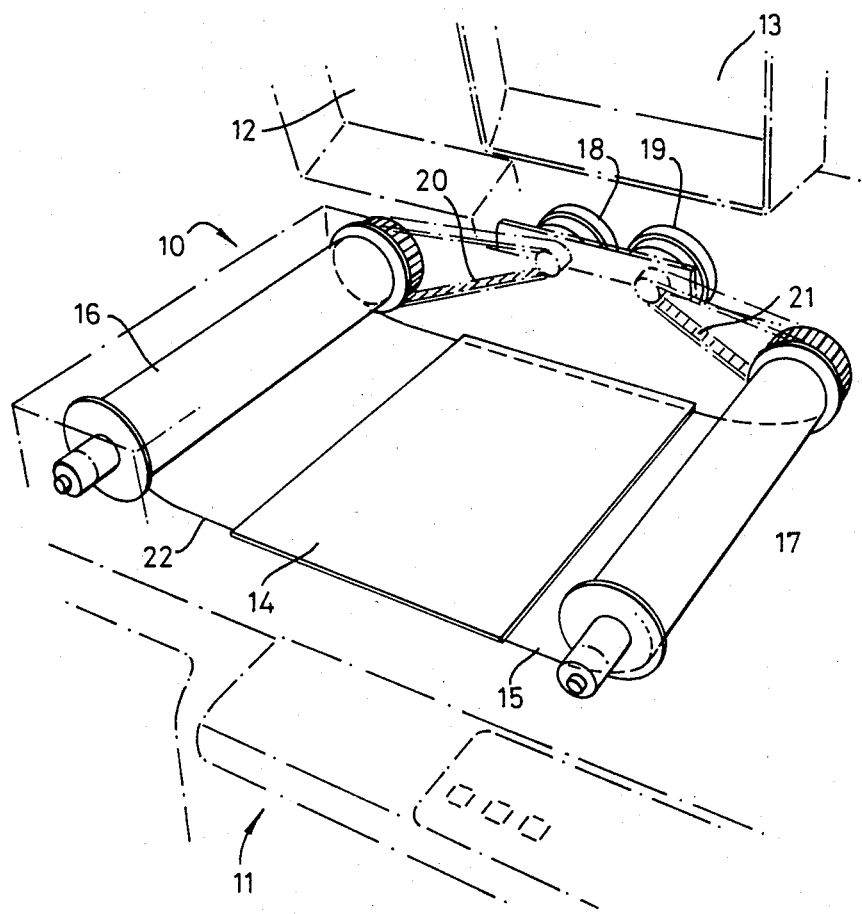

United States Patent [19]

Goemans

[11] Patent Number: 4,551,015

[45] Date of Patent: Nov. 5, 1985

[54] OVERLAY DEVICES

[75] Inventor: Hermanus I. Goemans, Blerick, Netherlands

[73] Assignee: Xerox Corporation, Stamford, Conn.

[21] Appl. No.: 534,032

[22] Filed: Sep. 20, 1983

[30] Foreign Application Priority Data

Sep. 20, 1982 [GB] United Kingdom ............... 8226792

[51] Int. Cl.$^4$ ............................................. G03B 27/62
[52] U.S. Cl. ......................................... 355/75; 355/79
[58] Field of Search ........................ 355/79, 40; 271/4

[56] References Cited

U.S. PATENT DOCUMENTS

| | | | |
|---|---|---|---|
| 3,259,037 | 7/1966 | Wilkinson | 355/40 X |
| 3,290,987 | 12/1966 | James et al. | 355/40 X |
| 3,490,844 | 1/1970 | Sapp | 355/40 |
| 3,642,370 | 2/1972 | Meredith et al. | 355/79 X |
| 3,677,146 | 7/1972 | Nielsen | 355/79 X |
| 3,913,118 | 10/1975 | Abrams | 355/79 X |
| 3,993,300 | 11/1976 | Dehner | 271/4 |
| 4,255,047 | 3/1981 | Chevin et al. | 355/79 |

Primary Examiner—Donald A. Griffin
Attorney, Agent, or Firm—William A. Henry, II

[57] ABSTRACT

An automatic overlay device is disclosed having a web for carrying a multiplicity of overlays. Individual overlays can be extended over a photocopying area by drive motors. A sensor is provided for counting markings on the web to indicate the number of overlays on the web, the sensor issuing a signal and the overlay device having a non-volatile memory responsive to the signal from the counting sensor for storing information concerning the number of overlays. Controls on the automatic overlay device allow a user to select a desired overlay, the arrangement being such that the motors move the web to expose the desired overlay in response to a signal from the control and comparison of the signal from the controls with information stored in the non-volatile memory.

17 Claims, 2 Drawing Figures

OVERLAY DEVICES

The invention relates to overlay devices for photocopying machines, being devices for laying a transparent web pre-printed or pre-marked in a desired way over the platen of the photo-copying machine to provide a copy of the or a selected part of pre-printed or pre-marked web.

Automatic overlay devices are known where a continuous transparent web has a set of pre-printed and pre-marked areas generally with some areas being left clear, where each area corresponds to an area to be photocopied. These areas will hereinafter be referred to as overlays. Known webs have carried a set of different identification markings one for each overlay, and the automatic overlay devices have had a detector for detecting the indicator markings corresponding to the overlays, a particular overlay selected by a user being brought into registration with the platen when the markings associated with the overlay are reorganised by the detector. Hitherto, such automatic overlay devices have used a fixed set of identification markings which means that each web used on the device must have a fixed number of overlays, and clear overlays must be in same positions on each web, thereby allowing little flexibility for a user or web designer.

According to the invention there is provided an automatic overlay device comprising a web carrying a multiplicity of overlays, mounting means for mounting the web such that individual overlays can be extended over a photocopying area, web transport means for moving the web sequentially between a home position where a first overlay is exposed and an end position in which a last overlay is exposed, means for counting the number of overlays, information storage means responsive to a signal from the counting means for storing information concerning the number of overlays, and control means for allowing a user to select a desired overlay, the arrangement being such that the transport means moves the web to expose the desired overlay in response to a signal from the control means and comparison of the signal from the control means with the information stored in the information storage means.

The web is preferably mounted on a pair of rollers, the rollers being spaced apart in the mounting means.

Detector means are preferably provided for detecting whether a particular overlay is clear or marked, and the information storage means is preferably responsive to a signal from the detector means to store information concerning the nature of each overlay. The detector means preferably further detect when the web is at the home position and at the end position and provide a corresponding signal to the information storage means for storage therein.

The counting means and the detector means preferably each have a sensor for sensing respective indicator markings on the web. The markings sensed by the counting means sensor are preferably on a first track and the markings detected by the detection means sensor are preferably on a second track. The detector means sensor may be triggered for a discrete time interval by a signal from the counting means sensor issued each time a transition from light to dark is sensed on the first track. A reverse arrangement could of course be used.

There are preferably battery means for powering the information storage means when a mains power supply is disconnected.

The control means preferably allows a user to select a clear overlay when the web is at any position, the web transport means being operated in response to a signal from the control means to select a clear overlay and based on information in the information storage means concerning the location of clear overlays to move the web to expose the nearest clear overlay.

The overlay device preferably comprises registration control means for registering the overlays over the platen when selected. The registration control means preferably comprises sensing means for sensing and issuing a first registration signal when a first registration marking of a selected overlay is reached, means responsive to the first registration signal to switch the transport means from a first speed to a second, lower speed, the sensing means issuing a second registration signal when a second registration marking is passed, and means responsive to the second signal to switch the transport means to a still lower registration speed until a final registration marking is sensed, and the transport means stopped in response to a final registration signal.

The transport means may be switched from the first speed to the intermediate speed by switching off the transport means for a predetermined period and switching on the transport means at the intermediate speed. The predetermined period may be 128 msec.

The registration sensing means may be the counting means sensor, and the registration markings may be the markings sensed by the counting means for counting the number of overlays.

There may be mechanical adjustment means for the registration point.

Means are preferably provided for operating the counting means for counting the number of overlays and for storing the information concerning the number of overlays when a new web is installed, or when a problem is detected. The operating means for when a new web is installed may comprise an automatically activated switch.

Figure 2:
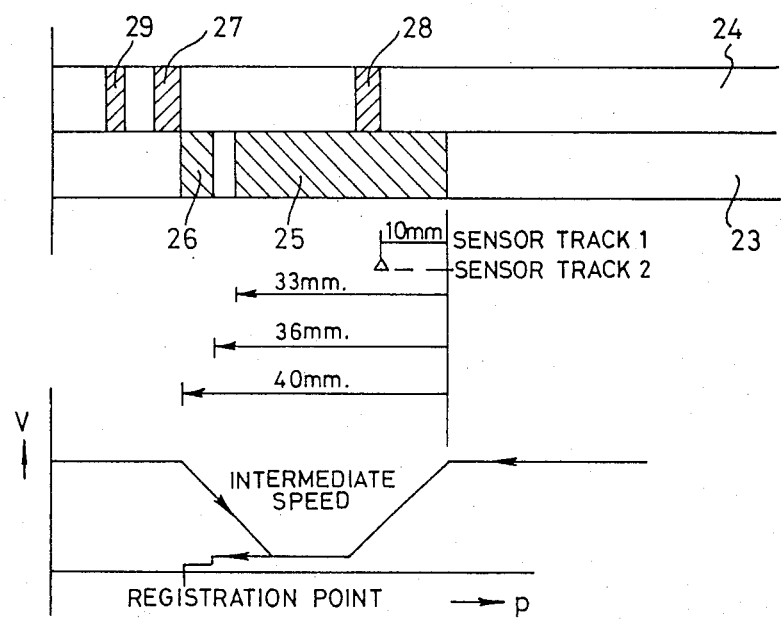

By way of example, one embodiment of an automatic overlay device according to the invention will now be described with reference to the accompanying drawings in which:

FIG. 1 is a general perspective view of an automatic overlay device to illustrate the main working parts; and FIG. 2 is a view showing part of indicator marking tracks on a web of the automatic overlay device together with a graphical illustration of how registration of an overlay is achieved.

As shown in FIG. 1, which it will be appreciated is of a diagrammatic nature only, an automatic overlay device 10 is located on top of a photocopier 11. The automatic overlay device 10 has a cover 12 shown in a raised position the cover 12 having an opening 13 to provide access to a platen 14 on which documents or other material can be laid for the purpose of photocopying.

Extending underneath the platen 14 is a web 15 carrying a set of overlays which can be brought into registration with the photocopying area to introduce pre-printed or marked areas onto a photocopy. The web 15 is mounted on two rollers 16 and 17 mounted in bearings and drive for the rollers 16 and 17 is provided by two stepper motors 18 and 19 respectively via toothed belts 20 and 21 respectively.

A control system for the automatic overlay device will now be described and reference will be made to FIG. 2 of the drawings which shows details of web markings and how the speed of the web is controlled to achieve registration of an overlay.

The web 15 carried two indicator tracks along its length and in the particular embodiment these tracks lie adjacent a front edge 22 of the web. The indicator tracks 23 and 24 (FIG. 2) are sensed by two sensors (not shown) which can distinguish between light and dark areas of the tracks. The sensor for the first track is positioned 10 mm to the right of the sensor for track 2 with the web extending as shown in FIGS. 1 and 2. The sensors for the first and second tracks 23 and 24 send signals to a control system for the automatic overlay device in accordance with what appears on the web tracks 23 and 24 above the respective sensors.

The information on the first track 23 concerns registration of individual overlays and the counting of overlays by the control system. The information on the second track 24 is concerned with the nature of a particular overlay, namely whether the overlay carries information, or whether the overlay is a clear overlay, whether the overlay is at a home end of the web (i.e. with most of the web would onto the left hand roller 16) or whether the web is at an end position (i.e. with most of the web wound on the right hand roller 17).

The control system has a non-volatile memory for storing information concerning the number of overlays and the nature of the overlays, together with the location of clear overlays. The non-volatile memory is maintained by a battery so that the information is not lost even when the main power is switched off.

The general sequence of operation of the automatic overlay device is that when a new web is inserted in the device 10, an interlock switch (not shown) is actuated and when the lid 12 is closed the home position of the web (overlay 0) is brought into registration. A web learning cycle is then initiated during which the web is run completely through to the end position and back to the home position. The sensor for the first track 23 sending signals to the control system which are counted each time registration markings 25 and 26 are passed, the registration marks 25 and 26 being present at each overlay. In this way, information concerning the number of overlays is stored in the non-volatile memory. At the same time, information from the sensor for sensing markings on the second track is sent to and stored in the non-volatile memory. The sensor for the second track is triggered only periodically. A light to dark transition on the first track 23 generates an interrupt and information on the second track 24 is read during a predetermined time window. The four types of overlay are sensed by different markings, all the types being shown in FIG. 2. A normal overlay carrying information has no marking at all on the second track 24, a clear overlay has a marking 27 in the position shown in FIG. 2 relative to the registration markings 25 and 26 on the first track 23. The overlay at the end position is distinguished by a marking 28 and the home position is indicated by a marking 29.

Thus, all the information concerning the number of overlays on the web and the nature of each overlay is stored in the non-volatile memory once the web learning cycle has been carried out. The web learning cycle is initiated, as stated above, when a new web is inserted into the overlay device and also when at the time the machine is switched on, the selected-overlay registered does not equal the current overlay selection register (this situation might occur if during overlay transport power is lost), or if an overlay transport jam has occurred and a jam recovery sequence is initiated. However, as the web information and the current position of the web is stored in the non-volatile memory, the web learning cycle is not normally initiated when the machine is switched on.

Registration of a selected overlay in relation to the platen 14 is achieved using the registration markings 25 and 26 on the first track 23. Registration is always effected with the web travelling in a direction from left to right as shown in FIG. 2 and when the sensor for the first track 23 detects the transition at 30 from the light to dark at the beginning of the first registration marking 25 a signal is sent to the control system and the web transport is stopped from the normal high transport speed and switched to an intermediate speed. This is achieved by a total motor cut off for 128 milliseconds, whereafter the intermediate speed is switched on. Transport of the web is continued at the intermediate speed until a second transition from light to dark is reached at point 31 where the second registration marking 26 begins. At this point, the intermediate motor speed is switched to a very low registration speed until the registration point is reached and the motor is switched off completely.

Overlay selection is carried out as follows:

When an overlay is selected by a selector control (not shown) on the automatic overlay device, the control system checks if the selected overlay is present prior to starting overlay transport. After this check, a calculation is done by the control system on the required index pulses relative to the current position of the web and transport of the web is started at transport speed, in this particular embodiment 485 r.p.m.

If at start up, no index sensor signal is sensed within 1.3 seconds after the motor starts, a jam is declared.

If during transport, a index sensor signal is missed, a jam is declared. A jam is declared if no index pulse is sensed within 760 milliseconds after the previous index pulse.

To reduce problems with contamination on the web index sensor track, a software filter is included. Furthermore, the sensor is only interrogated within certain time slots relative to the last index signal, the result being that 30% of an overlay sensor track length is active for index signal sensing. Further precautions are taken within the software to prevent miscounting on web contamination or electrical noise.

During overlay transport, information from the sensor for the second track 24 is compared with the information stored in the non-volatile memory. If the information from the second track sensor does not comply with the information stored in the memory, a jam is declared. Such a jam will only be generated when passing a clear overlay or reaching the home position or end position since the second track 24 carries information only on such overlays.

When the selected overlay is reached, the drive motor is stopped for 128 milliseconds allowing time for the rollers to stop, resetting the driver-PWBA and setting the direction relay in forward position. When the time period has elapsed, the motor is started at intermediate speed (170 r.p.m.).

If a pre-registration mark is not detected within 350 milliseconds after the start of the motor, a jam is declared.

When the pre-registration mark is detected, the motor is immediately switched to registration speed (25 r.p.m.) and if the registration mark is not detected within 220 milliseconds after motor speed change, a jam is declared.

The motors 18 and 19 are stepper motors, control for the stepper motors being set out in our co-pending application entitled "Stepper Motor Drive" filed today.

Means for mechanically adjusting the registration point may be provided (not shown).

This embodiment of an automatic overlay device has the advantage that the total number of overlays on a particular web can be freely chosen, up to a maximum allowed for by the overlay device itself. This is a significant advantage over prior overlay devices which, because of the inflexible nature of their control systems, have needed to have the same number of overlays on each web roll.

A further advantage is that the position and number of clear overlays can be freely chosen. Since these clear overlays are required for normal copying, the productivity of the machine is optimised where searching time for a clear position is minimised. The control system of the preferred embodiment of the automatic overlay device stores information concerning the position of the clear overlays and when a clear overlay is required, will move the web to register the nearest clear overlay in the photocopying position.

A further advantage is that information about the position of the web and the positions of the special overlays is maintained, even after power cut off, thus eliminating the need for rewind to the home position after such a cut off.

What is claimed is:

1. An automatic overlay device, comprising:
a web carrying a multiplicity of overlays, mounting means for mounting the web such that individual overlays can be extended over a photocopying area, web transport means for moving the web sequentially between a home position where a first overlay is exposed and an end position in which a last overlay is exposed including through a web learning cycle, means for counting the number of overlays during said web learning cycle, information storage means responsive to a signal from the counting means for storing information concerning the number of overlays counted during said web learning cycle, and control means for allowing a user to select a desired overlay, the arrangement being such that the transport means moves the web to expose the desired overlay in response to a signal from the control means and comparison of the signal from the control means with the information stored in the information storage means.

2. An automatic overlay device as claimed in claim 1, wherein the web is mounted on a pair of rollers, the rollers being spaced apart in the mounting means.

3. An automatic overlay device as claimed in claim 1, wherein the counting means comprises a sensor for sensing indicator markings on the web.

4. An automatic overlay device as claimed in claim 3, wherein the markings sensed by the counting means sensor are arranged on a track on the web.

5. An automatic overlay device as claimed in claim 4, comprising detector means for detecting whether a particular overlay is clear or marked, the information storage means being responsive to a signal from the detector means to store information concerning the nature of each overlay.

6. An automatic overlay device as claimed in claim 5, wherein the detector means further detect when the web is at a home position and at an end position and provide a corresponding signal to the information storage means for storage therein.

7. An automatic overlay device as claimed in claim 6, wherein the detector means comprises a sensor for sensing respective indicator markings on the web.

8. An automatic overlay device as claimed in claim 7, wherein the markings detected by the detector means sensor are on a track on the web.

9. An automatic overlay device as claimed in claim 7, wherein the detector means sensor is triggered for a discrete time interval in response to a signal from the counting means.

10. An automatic overlay device as claimed in claim 9, including battery means for powering the information storage means when a main power supply is disconnected.

11. An automatic overlay device as claimed in claim 1, wherein the control means allows a user to select a clear overlay when the web is at any position, the control means comprising means for operating the transport means in response to a signal from the control means to select a clear overlay an based on information in the information storage means concerning the location of clear overlays to move the web to expose the nearest clear overlay.

12. An automatic overlay device as claimed in claim 1, including means for operating the counting means for counting the number of overlays and for storing the information concerning the number of overlays when a new web is installed.

13. An automatic overlay device as claimed in claim 12, wherein the operating means for when a new web is installed comprises an automatically actuated switch.

14. An automatic overlay device as claimed in claim 1, wherein means are provided for operating the counting means and for counting the number of overlays and for storing the information concerning the number of overlays when a problem is detected.

15. An automatic overlay device, comprising:
a web carrying a multiplicity of overlays, mounting means for mounting the web such that individual overlays can be extended over a photocopying area, web transport means for moving the web sequentially between a home position where a first overlay is exposed and an end position in which a last overlay is exposed, means for counting the number of overlays, information storage means responsive to a signal from the counting means for storing information concerning the number of overlays, and control means for allowing a user to select a desired overlay, the arrangement being such that the transport means moves the web to expose the desired overlay in response to a signal from the control means and comparison of the signal from the control means with the information stored in the information storage means, and registration control means for registering overlays over the photocopying area when selected, said registration control means comprising registration markings on the web and sensing means for sensing and issuing a first registration signal when a first registration marking of a selected overlay is reached, means responsive to the first registration signal to switch the transport means from a first speed to a second, lower speed, the sensing means issuing a second registration signal when a second registration marking is passed, and means responsive to the second signal to switch the transport means to a still lower registration speed until a final registration marking is sensed and the transport means stopped in response to a final registration signal.

16. An automatic overlay device as claimed in claim 15, wherein the transport means are switched from the first speed to the intermediate speed by switching off the transport means for a predetermined period and switching on the transport means at the intermediate speed at the end of the predetermined period.

17. An automatic overlay device as claimed in claim 16, wherein the predetermined period is 128 milliseconds.

* * * * *